United States Patent [19]

Vorbeck

[11] 4,269,147
[45] May 26, 1981

[54] ANIMAL WATERING SYSTEM

[75] Inventor: Donald W. Vorbeck, Napa, Calif.

[73] Assignee: Atco Manufacturing Co., Inc., Napa, Calif.

[21] Appl. No.: 126,176

[22] Filed: Mar. 3, 1980

[51] Int. Cl.³ .......................... A01K 7/00; E03B 7/10
[52] U.S. Cl. ........................................ 119/73; 137/62
[58] Field of Search .......................... 119/72, 73, 72.5; 137/59, 62; 237/80

[56] References Cited

U.S. PATENT DOCUMENTS

| | | | |
|---|---|---|---|
| 3,169,510 | 2/1965 | Fulton, Jr. | 119/73 |
| 3,636,312 | 1/1972 | Dreher et al. | 119/73 X |
| 3,734,063 | 5/1973 | Atchley | 119/72.5 |
| 3,949,707 | 4/1976 | Armstrong et al. | 119/73 |
| 4,126,108 | 11/1978 | Christensen | 137/62 X |

FOREIGN PATENT DOCUMENTS 931043  7/1973  Canada ...................................... 137/62

OTHER PUBLICATIONS

"Circulating Watering System," Bulletin No. WB-310 by Clay Equipment Corporation, Cedar Falls, Iowa.

Primary Examiner—Robert Peshock
Assistant Examiner—Robert P. Swiatek
Attorney, Agent, or Firm—James R. Cypher

[57] ABSTRACT

An animal watering system with automatic protection from electrical power failure, over heating, water supply failure, or restriction and air build-up in the system consisting briefly of a closed loop recirculating water system buried beneath the frost line, a water pump recirculating the water, an electrical heater in the recirculation system, an air storage tank, an air supply line connecting the air storage tank with the recirculating water supply line, a normally closed valve in the air line connecting the air storage tank and the circulating water line, a normally closed drain valve in the recirculating water line, a normally open valve in the line supplying water to the recirculating distribution line and a control circuit for closing the supply valve and opening the drain valve and the air valve in the event of electrical power failure. The system may also include an air vent for automatically purging air from the system so that the water pump may operate efficiently. The system may also include a flow sensor means connected to a control device for automatically turning off the electrical heater in the event of flow restriction or supply failure and purging water from the entire system. The system may also include a temperature sensor for turning off the heater if the temperature of the water in the system exceeds a certain given temperature.

5 Claims, 1 Drawing Figure

ANIMAL WATERING SYSTEM

BACKGROUND OF THE INVENTION

Demand delivery watering systems for pigs and sheep using animal actuated valves, as for example, Atchley, U.S. Pat. No. 3,734,063 granted May 22, 1973, are now used extensively. Many farms using such systems are located in geographic areas where temperature extremes occur. Clay Equipment Corporation of Seattle Falls, Iowa offered a circulating water system which attempted to prevent freezing by burying the distribution pipes below frost line so that the earth would warm the water in the winter and cool it in the summer. Applicant does not believe the system is still offered since it is believed that the system could not prevent freezing of the water bowls.

In 1977, Atco Manufacturing Co., Inc. designed a recirculating system for the Battelle Research Institute which was installed in the State of Washington in 1977. This system used nipple valves as set forth in U.S. Pat. No. 3,734,063, supra and the supply pipes were buried below the frost line. The system as furnished to Battelle was not placed in production because it had several serious design problems. First, if a power failure occurred, the electric heater ceased to function, the recirculation pump stopped and the water in the system froze under extreme cold conditions. Because the pipes were buried deep in the ground, the system could not be reactivated for weeks or even months. Further, the Battelle system failed when the amount of flow through the heating element was insufficient and the water was turned to steam thereby introducing air into the system and preventing the pump from circulating the water. The Battelle system also lacked a device for expelling air under any condition and did not have sensing devices to shut down the system when the water temperature in the system exceeded high levels.

Others have attempted to prevent the supply pipes from freezing by wrapping them with insulated electrical heating tape. Such systems work satisfactorily until the electrical power system fails. A standby diesel-electric system is generally too costly.

Since power system failure is frequent in many regions with cold climates, no automatic recirculating system is sufficiently reliable unless there is automatic freeze protection in the event of power failure.

SUMMARY OF THE INVENTION

In the event of power failure causing the water heater to fail and the recirculating water pump to cease operation, the system of the present invention causes all of the water in the animal watering system to be purged from the system. With all of the water expelled from the system, there is no water to freeze causing pipes to burst or permanently block the system until the ground thaws. The gist of the present invention is the use of automatically operating valves and the use of stored compressed air to expell all water from the system.

Water in the system can also be purged by the stored compressed air in the event that there is a water supply failure or a blockage in the system causing a radical decrease in the flow of water.

Finally, the present system automatically expells air in the system so that the water pump will always operate efficiently.

Figure 1:
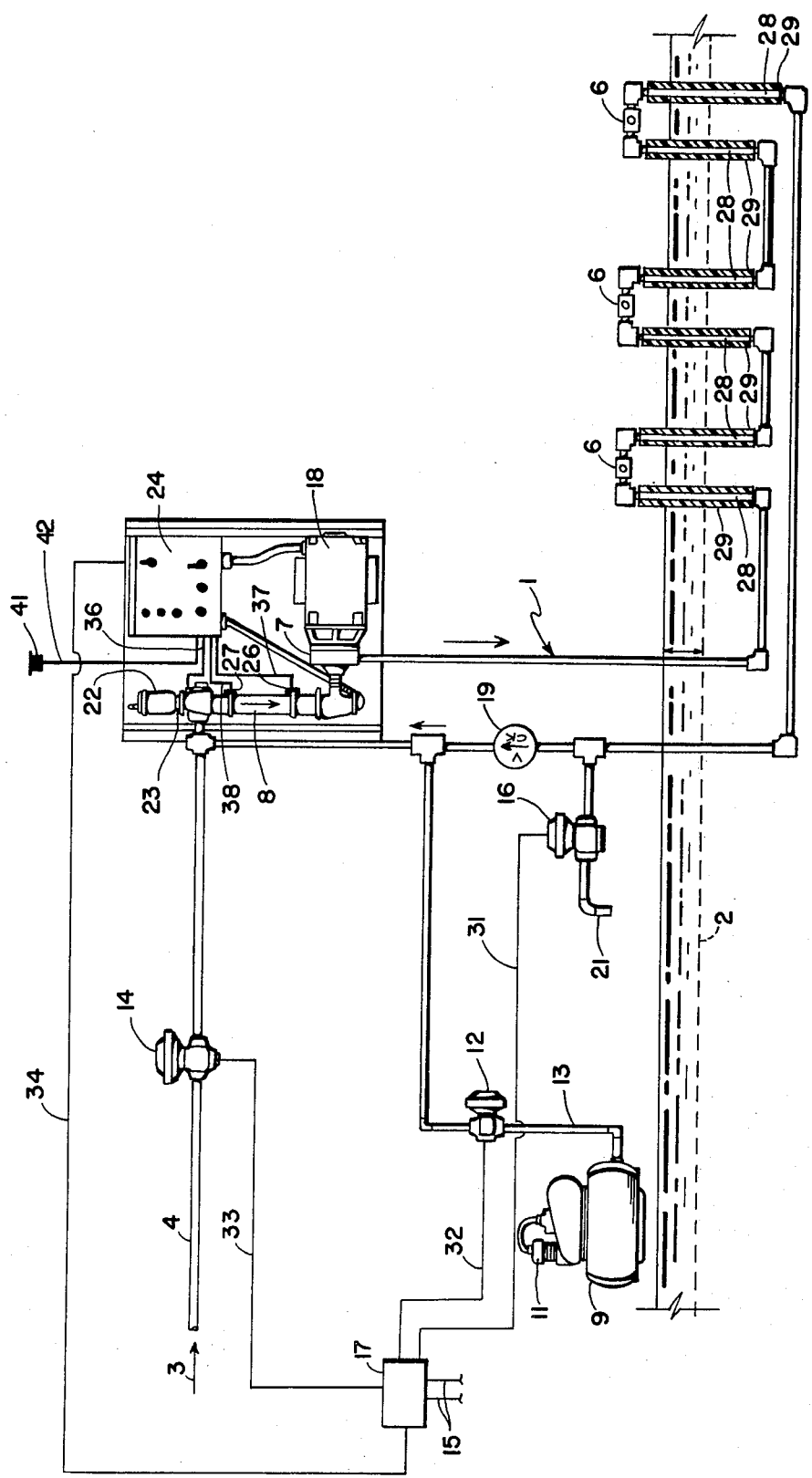
FIG. 1 is a schematic diagram of the system of the present invention.

DESCRIPTION OF THE PREFERRED EMBODIMENTS OF THE INVENTION:

The present invention consists of a loop water distribution line 1 with a substantial portion buried below the frost line 2. A water supply source is indicated by arrow 3 is connected to the distribution line by a supply line 4. Demand animal actuated valves 6 are connected to the distribution line. A recirculation water pump 7 is connected to the distribution line. An electrical heater element 8 is mounted in the distribution line. A compressed air storage tank 9 connected to an air compressor means 11 is connected to the water distribution line. A normally closed power actuated solenoid air valve 12 is mounted in the compressed air line 13. A normally open power actuated solenoid water supply valve 14 is mounted in the water supply line. A normally closed power actuated solenoid water discharge valve 16 is mounted in the water distribution line. A system purge control means 17 connected to electrical power lines 15 is operatively connected to the valves for closing the water supply valve, opening the water drain valve and opening the air valve in the event of an electrical power failure for purging all water from the animal watering system.

The demand animal actuated valves may be of various manufacture and are designed to be actuated by the mouth or tongue of an animal. One of these valves is described in U.S. Pat. No. 3,734,063 supra. The use of demand valves as described is important in that the entire system may have only 15 or 20 gallons of water.

The water pump motor 18 may be continuous duty ⅓ horsepower fully enclosed thermal protected, fan cooled with capacitor start. The motor may drive a pump of suitable capacity such as a 26 gallon per minute, no head flow, ¾" FPT inlet, ½" FPT outlet, brass construction with ceramic seals.

The electrical heater element may be selected to meet the particular climatic conditions and size of the system. As an example, a 1500 watt 110 VAC or 3000 watt with 220 VAC element may be used. The element operates intermittently as needed.

The small stand-by air compressor 11 and air storage tank 9 are coupled into the loop distribution system with a latching relay control, a check valve 19 and three power actuated solenoid valves, 12, 14, and 16. Upon power failure the solenoid valves deactivate and latch in power off position. This automatically shuts off the incoming water supply, opens the loop drain valve 16 turns on the air valve 12 and forcefully expells all water out of the loop distribution line through the drain line. With no water in the distribution system, there is no danger of freezing during a power interruption. When the power comes on again, the latching relay control is manually reset to repeat the procedure in the event of another power failure.

The use of an emersion heater in a restricted space can cause the introduction of air into the system and interfere with the operation of the centrifugal pump. For this reason, the electrical heater element is mounted in a vertical section of the water distribution line and air vent means 22 is mounted about the heater. Several types of air vent mechanisms are available. Applicant has found that an off-the-shelf air vent model 75 made by Maid-O-Mist of 3217 North Pulaski Road, Chicago, Ill. functions satisfactorily. The air vent includes a float mechanism and as the water drops in the air vent means, the float mechanism is connected to a leakage system which opens a valve similar to an air valve on an automobile tire. As soon as the air pressure is released, the float mechanism rises and closes the air valve. The air vent may also be modified to serve as a pressure relief valve in the event that steam is generated by the emersion heater.

Another safety feature of the present system is the use of a water flow means 23 mounted in the water distribution line on the upstream side of the electrical heater element for sensing the flow of water therethrough. This water flow means may be an off-the-shelf item manufactured by Atco Manufacturing Co., Inc. of Napa, Cal. and consists of a reed switch with a magnet that senses movement of water. The water flow means is operatively connected to the control means 24 and the electrical heater element for automatically turning off the electrical heater element at a pre-selected minimum flow rate. The water flow means will also sense a decrease in water flow if the supply water fails or there is a blockage in the line. In both instances, the heater element will be turned off.

The water flow sensor means may also be connected to the system purge control means 17 so that if the heater is turned off due to a restricted flow condition, the system will automatically be purged of water so that freezing can not occur.

Still another safety device is the use of a safety thermistor 26 mounted in the vertical section of water distribution line adjacent the electrical heating element and pump outlet. The safety termistor is operatively connected to the control means 24 for turning off the electrical heating element 8 at a pre-selected maximum temperature.

The operation of the system of the present invention is energy efficient. It utilizes the dynamics of moving water, heat mixing, heat transfer, and heat exchange as the primary mechanism of providing and maintaining cool water in the summer and ice-free water in the winter. A second source of energy for both cooling and heating is the natural earth heat exchange in the buried distribution lines. This natural earth heat exchange in buried supply lines provides adequate freeze protection for all but extreme freezing conditions. The recovery and use of natural earth heat exchange for cooling, heating, and freeze protection results in a net energy cost reduction for the benefit delivered.

The system may be set for a summer mode by turning on a summer switch. A remote thermistor 41 connected to control means 24 by line 42 senses the ambrient outside air temperature and turns the circulating pump on at 85° F. and off at 81° F.

The circulating pump goes on a 38° F. and off at 40° F. air temperature. At 38° F., air temperature, the temperature of the circulating water will typically be 40° to 50° F. As the air temperature drops, the water temperature will start dropping gradually. A second thermistor 27 senses the temperature of the water in the return line and turns the heater on at 38° F. and off at 42° F. A safety thermistor senses the water at the pump outlet and turns the heater off should the water temperature ever climb to 140° F. An overload thermal safety shuts off the motor at 180° F. In the event of motor or pump failure, the flow sensor switch 23 shuts off the heating element and turns on the red no-flow warning light and sounds an audible alarm.

Conventional "dead-end" water distribution systems entail risks of total freeze-up in the event of power outage and require expensive auxiliary power generation. With the present "closed loop" system and the inclusion of the water purging system by compressed air, auxiliary electrical generation is not necessary. With the latching relay control, the one-way-flow check valve 19 and the three powered actuated solenoid valves upon power failure, and after a three minute delay, the solenoid valves deactivate and latch in power-off position. This automatically shuts off the incoming water supply, opens the drain valve and turns on the air valve and forcefully expells all the water in the loop distribution system out the drain line. With no water in the line, as stated above, there is no danger of power-out freezing. When the power comes on again, the latching relay control is manually reset to repeat the procedure in the event of another power failure.

Heat conduction through the pipe fittings and metal valve body is utilized to prevent freezing in the nipple drinkers. It is important that the nipple valves are installed directly in the "tee" or "cross" fittings in the loop system, not in offset branch extensions. Branch extensions create a static no-flow water condition and there is a hazard of nipple-freeze up.

The control module provides special by-pass circuitry to enable the user to manually test, at will the operating conditions of the system. This enables the user to test both the circuits and function and know in advance that the system is operational prior to weather change and expected use.

It is to be understood that the installation of the present system requires the proper selection of pipe size, length of line, sensor location for the site conditions, type of operation and benefit-cost-risk decisions. The depth of the frost line must be determined and the difference in heat loss and freezing risk between steel, copper and plastic pipe determined.

The system may be used in various applications such as horse, cattle and dairy herd watering. Other possible uses include summer cooling and winter warming of concrete sleeping pads and building floors. The distribution lines may be emersed in waste dump pits or run through heated buildings to pick-up additional heat. The system purge control means, electrical heater element, heater control means and temperature sensing means may be obtained as off-the-shelf items from Atco Manufacturing Co., Inc. of Napa, Calif.

The connecting lines 28 connecting the demand valves 6 to the loop distribution lines 1 may be insulated by placing plastic pipes 29 around connecting lines 28.

The system purge control means 17 is connected to air valve 12 by line 32, to drain valve 16 by line 31 and to supply valve 14 by line 33. Line 34 connects purge control means 17 to control means 24.

Control means 24 is connected to water flow means 23 by line 36, to safety thermistor 26 by line 37, and to second thermistor 27 by line 38.

I claim:
1. An animal watering system comprising:
   a. a loop water distribution line;
   b. a water supply connected to said distribution line by a supply line;
   c. demand animal-actuated valves connected to said distribution line;

d. a recirculation water pump connected to said distribution line;
e. an electrical heater element mounted in said distribution line;
f. a compressed air storage tank;
g. air compressor means connected to said air storage tank for filling said tank with compressed air;
h. a normally closed power actuated solenoid air valve mounted in said compressed air line;
i. a normally open power actuated solenoid water supply valve mounted in said water supply line;
j. a normally closed power actuated solenoid water discharge valve mounted in said water distribution line;
k. a check valve in said distribution line downstream of said power actuated solenoid water discharge valve; and
l. system control means operatively connected to said valves for closing said water supply valve, opening said water drain valve, and opening said air valve in the event of an electrical power failure for purging all water from said animal watering system.

2. An animal watering system as described in claim 1 comprising:
a. said electrical heater element is mounted in a vertical section of said water distribution line; and
b. air vent means mounted above said vertical section of said water distribution line containing said heater element in communication therewith.

3. An animal watering system as described in claim 2 comprising:
a. water flow sensor means mounted in said water distribution line on the upstream side of said electrical heater element for sensing the flow of water therethrough; and
b. heater control means operatively connecting said water flow means and said electrical heater element for automatically turning off said electrical heater element at a preselected minimum flow rate.

4. An animal watering system as described in claim 3 comprising:
a. said system purge control means is operatively connected to said water flow means for purging all water from said animal watering system when said water flow means turns off said electrical heater element.

5. An animal watering system as described in claim 2 comprising:
a. temperature sensing means mounted in said vertical section of said water distribution line adjacent said electrical heating element;
b. said temperature sensing means is operatively connected to said heater control means for turning off said electrical heating element at a preselected maximum temperature.

* * * * *